July 15, 1969    J. J. McGRATH    3,455,613
COMPOSITE MARINE BEARING
Filed Oct. 11, 1966
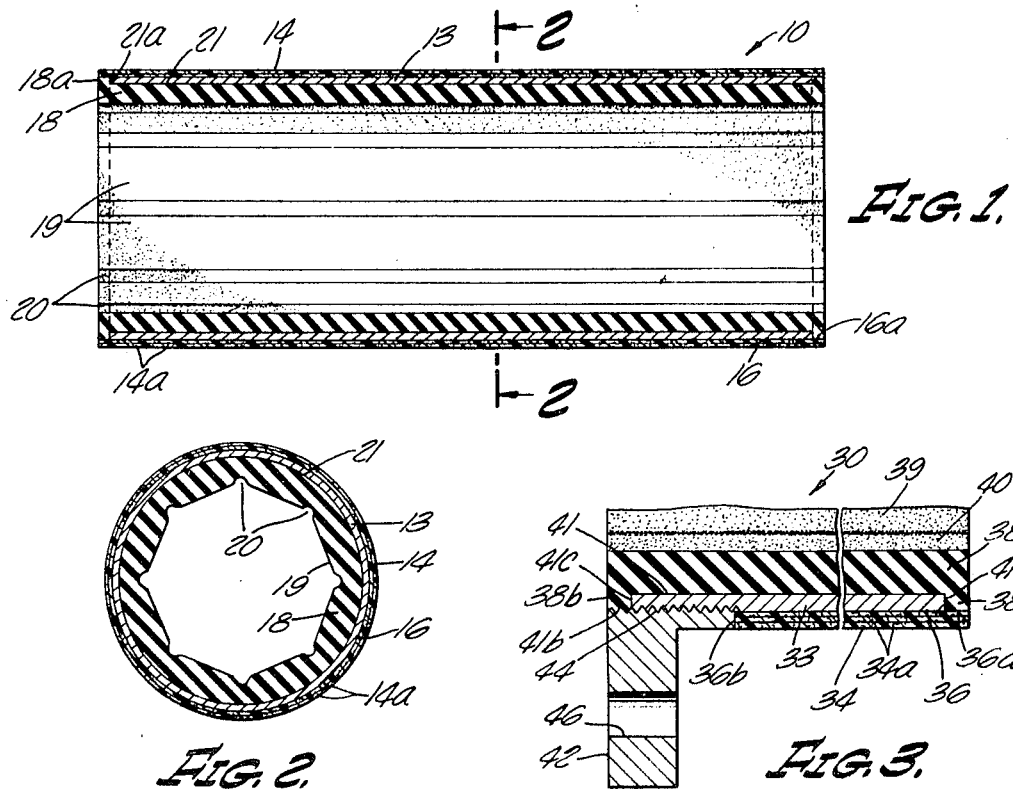
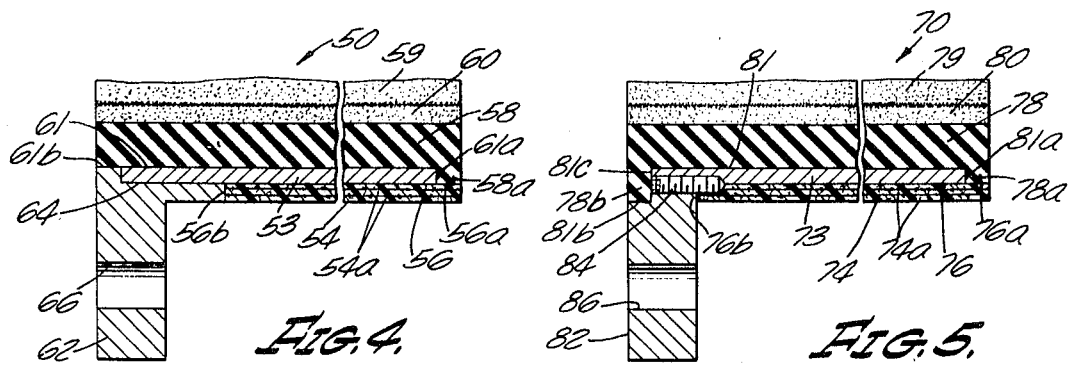
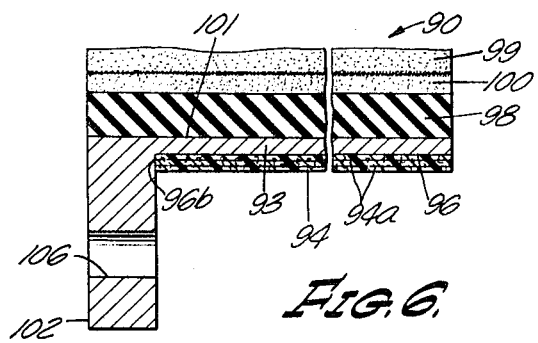
JOHN J. McGRATH
INVENTOR.
BY C. G. Stallings
ATTORNEY United States Patent Office 3,455,613
Patented July 15, 1969

3,455,613
COMPOSITE MARINE BEARING
John J. McGrath, Fullerton, Calif., assignor to Byron Jackson Inc., Long Beach, Calif., a corporation of Delaware
Filed Oct. 11, 1966, Ser. No. 585,823
Int. Cl. F16c 27/00, 35/00
U.S. Cl. 308—26                                       4 Claims

ABSTRACT OF THE DISCLOSURE

A water-lubricated bearing of unitary, cylindrical, composite construction adapted for mounting in the annular cylindrical space between a rotatable shaft and a bearing housing, the bearing having a metal reinforcing sleeve and integral, concentric, non-electrically conductive bearing and supporting sleeves encompassing the metallic sleeve so as to insulate the metal sleeve and minimize electrolytic corrosion between metal components submerged in the water.

---

This invention relates to bearings, and more particularly to water-lubricated bearings for marine use, which are generally installed in the stern tube or strut support of power-driven boats and the like for supporting the rotating propeller shaft.

Since water is a natural and excellent surface lubricant for rubber, it has been common practice for many years to make marine bearings for use on propeller shafts, rudder posts, and the like with an inner bearing sleeve of rubber or related materials against which a shaft turns, there being longitudinal internal grooves or flutes provided in the sleeve between the bearing surfaces to allow for flow of lubricating and cooling water and efflux of silt, sand, and other abrasive particles.

The more common types of marine bearings have a supporting cylindrical sleeve or bushing, usually of naval brass, to the inside of which the rubber sleeve is molded and adhesively bonded. To install a bearing, it is pressed into a corresponding cylindrical opening in the stern tube or strut support of the boat, and sometimes held in place with a set screw; or the supporting sleeve may also include a flange on one end, the flange having bolt holes through which it is bolted to the bearing support. These bearings are described in the United States Navy Bureau of Ships drawing 810/1385664, dated Nov. 16, 1962, Sheet 4 (Revision A) and Sheet 5 (Revision B).

Electrolysis and corrosion have always been a problem, particularly in salt water and with steel-hull ships, resulting in rusting, deterioration, and binding of the bearing sleeves in the bearing supports, and damage to the latter and other metal parts of the ship's hull. There is consequently a need for non-conductive and non-metallic bearings which isolate the shaft and the bearing support from metallic contact to preclude electrolysis and rusting. A non-metallic bearing made to avoid this problem is described in United States Patent No. 3,023,059, issued Feb. 27, 1962, to R. B. Kirk.

These non-metallic bearings have been effective in small sizes (for propeller shafts up to about 3″ diameter) where they provide sufficient strength and rigidity. In the flanged-type bearings and larger sleeve-type bearings, however, additional strength and rigidity are required for installation and removal of the bearings and to avoid warpage and distortion.

It is therefore a primary object of this invention to provide a composite, metal-reinforced, sleeve-type marine bearing, the exposed surfaces of which are non-metallic and non-conductive electrically, and therefore not subject to electrolytic action or corrosion.

Another object of the invention is to provide a metal-reinforced sleeve-type marine bearing, the exposed surfaces of which are non-metallic, whereby to insulate a rotating shaft within the bearing from the bearing support.

An additional object of the invention is to provide a composite marine bearing with high strength, light weight, low cost, and non-corrosive properties.

Another additional object of this invention is to provide a composite marine bearing of unitary, adhesively-bonded construction.

Still another object of the invention is to provide a composite, high-strength marine bearing easily removable after use, that is, which does not rust, corrode, warp, or expand, thereby binding itself to the bearing support into which it fits.

Yet another object of the invention is to provide a composite, non-conductive marine bearing of high dimensional stability, not subject to warpage or distortion in its production or usage.

A further object of this invention is to provide a flanged-type marine bearing of composite construction, the parts of which in contact with its tubular support and the rotating shaft are insulating and non-corrosive.

A still further object of the invention is to provide a flanged-type, composite marine bearing of light weight, high strength, and low cost construction.

Briefly, the invention includes three concentric sleeves: a supporting sleeve, a reinforcing sleeve, and a bearing sleeve; the supporting sleeve being bonded to one cylindrical surface of the reinforcing sleeve and providing an external surface adapted to be snugly and removably fitted to a bearing support; the bearing sleeve being bonded to the other cylindrical surface of the reinforcing sleeve, which is of metal; the bearing sleeve being of resilient, elastomeric material and adapted to insulate the reinforcing sleeve from a member rotatably supported thereby; the supporting sleeve being of thermoset synthetic resin composition reinforced with fibrous material and adapted to insulate electrically the reinforcing sleeve from the bearing support; the reinforcing sleeve being substantially completely encased by the bearing sleeve and the supporting sleeve to isolate substantially the reinforcing sleeve from surrounding water; a flange carried by one end of the reinforcing sleeve; and means for securing the flange to the reinforcing sleeve including a thread on the outside of one end of the reinforcing sleeve and a complementary thread on the inside of the flange. The means for securing the flange to the reinforcing sleeve may alternatively include: a cylindrical surface on the outside of one end of the reinforcing sleeve and a complementary tight-fitting cylindrical surface on the inside of the flange; or, a cylindrical surface on the outside of one end of the reinforcing sleeve, a complementary cylindrical surface on the inside of the flange, and screws engaging both of the surfaces.

Further objects will become evident as the invention is described in the following detailed description, along with the accompanying drawings.

In the drawings:

FIG. 1 is a longitudinal sectional view of a composite marine bearing in accordance with the invention;

FIG. 2 is a cross-sectional view, taken on the line 2—2 of FIG. 1 and looking in the direction of the arrows;

FIG. 3 is a fragmentary sectional view of a modified or flanged embodiment of the invention, on an enlarged scale;

FIG. 4 is a fragmentary sectional view of another flanged embodiment of the invention, on the same scale;

FIG. 5 is a fragmentary sectional view of a third flanged embodiment of the invention, on the same scale; and FIG. 6 is a fragmentary sectional view of a fourth flanged embodiment of the invention, still on the same scale as FIG. 3.

Like reference characters in the various figures and in the following detailed description designate corresponding parts.

Referring to FIGS. 1 and 2, a cylindrical-type marine bearing 10 exemplary of this invention is illustrated, with its outer supporting sleeve 14 composed of concentric plies 14a of resin-impregnated fibrous material, such as paper, woven cloth or duck, or woven glass fibers; a slightly shorter intermediate reinforcing sleeve 13 of metal, preferably steel; and an inner bearing sleeve 18 of rubber or other elastomeric rubber-like resilient material with good bearing characteristics, its ends having outwardly extending portions 18a covering the ends of the sleeve 13 and the inner portions of the ends of the sleeve 14. The bearing sleeve 18 has an inner polyhedral shape, with flat bearing surfaces 19 and flutes 20; and it is bonded to the cylindrical surface of the intermediate or reinforcing sleeve 13 by a layer of bonding cement 21, and its end portions 18a to the ends of the sleeve 13 by a layer of bonding cement 21a. One cement used for this purpose to form an adhesive or chemical bond is known by the trade name "Chem-Lok." The plies 14a of the supporting sleeve 14 are impregnated and bonded together with a thermoset synthetic resin composition, preferably phenol formaldehyde or other suitable phenolic resin, which also forms a bond between the sleeve 14 and the outer surfaces of the sleeve 13 and the sleeve end portions 18a. This bond is enhanced by a layer of adhesive bonding cement 16 between the sleeves 13 and 14 and a layer 16a between the sleeve 14 and the end portions 18a.

Referring now to FIG. 3, one form of flanged-type marine bearing 30 is shown as a further embodiment of this invention. The unflanged or cylindrical end is identical to the corresponding portion of the cylindrical-type bearing 10 described above. The bearing 30 has an outer supporting sleeve 34 composed of concentric plies 34a of resin-impregnated fibrous material, such as paper, woven cloth or duck, or woven glass fibers; an intermediate reinforcing sleeve 33 of metal, preferably of steel; and an inner bearing sleeve 38 of rubber or other elastomeric rubber-like resilient material with good bearing characteristics, its ends having outwardly extending portions 38a and 38b. One end of the sleeve 33 is threaded on the outside to a complementary inside thread of a flange 42 to form a threaded connection 44, thus securing the two parts 33 and 42 together as a unitary structure, the bolt holes 46 of the flange 42 providing a means for fastening the bearing 30 to a bearing support (not shown). The flange 42 is composed of a corrosion-resistant metal, such as naval brass, anodized aluminum, or stainless steel. The bearing sleeve 38 has a polyhedral inside shape, with plane flat surfaces 39 and flutes 40 at the corners; and is bonded to the cylindrical surface of the sleeve 33 with a layer of bonding cement 41, its outwardly extending portion 38a to the plain end of the sleeve 33 with a layer of bonding cement 41a, and its outwardly extending portion 38b to the threaded end of the sleeve 33 with a layer of bonding cement 41c and to the internal portion of the flange 42 with a layer of bonding cement 41b. The plies 34a of the supporting sleeve 34 are impregnated and bonded together with a thermoset synthetic resin composition, which also forms a bond between the sleeve 34 and the outer surfaces of the reinforcing sleeve 33, the outwardly extending portion 38a of the bearing sleeve 38, and the back surface of the flange 42 against which it abuts. This bond is enhanced by a layer of adhesive bonding cement 36 between the sleeves 33 and 34, a layer of cement 36a between the sleeve 34 and the end portion 38a, and a layer of cement 36b between the sleeve 34 and the abutting portion of the flange 42. The strength of the threaded connection 44 may also be enhanced by the application to the threads prior to threading together of a metal-to-metal bonding cement, such as a heat-activated epoxy cement, to form an adhesive or chemical bond therebetween at the connection 44. One such heat-activated, epoxy-type, metal-to-metal bonding cement applicable for this purpose is known by the trade name "Scotch-Weld."

Referring to FIG. 4, another embodiment of the invention is shown in the flanged-type marine bearing 50, which has an outer supporting sleeve 54 composed of concentric plies 54a of resin-impregnated fibrous material, an intermediate reinforcing sleeve 53 of steel, and an inner bearing sleeve 58 of elastomeric material, its end having an outwardly extending portion 58a. One end of the reinforcing sleeve 53 is pressed into a mating or complementary inside portion of a corrosion-resistant flange 62 to form a connection 64. The strength of the connection 64 may be enhanced by the application to the mating surfaces prior to assembly of a heat-activated epoxy-type bonding cement to form a strong bond at the connection 64. The bolt holes 66 of the flange 62 provide a means for fastening the bearing 50 to a bearing support. The bearing sleeve 58 has a polyhedral inside shape, with bearing surfaces 59 and flutes 60 at the corners for water circulation, and is bonded to the inside cylindrical surface of the reinforcing sleeve 53 with a layer of bonding cement 61, its outwardly extending portion 58a to one end of the sleeve 53 with a layer of bonding cement 61a, and at the flange-end of the bearing 50 to the inside of the flange 62 with a layer of bonding cement 61b. The plies 54a of the supporting sleeve 54 are impregnated and bonded together with a thermoset synthetic resin composition, which also forms a bond between the supporting sleeve 54 and the outer cylindrical surface of the reinforcing sleeve 53, the outwardly extending portion 58a, and the back surface of the flange 62 against which it abuts. This bond is enhanced by a layer of adhesive bonding cement 56 between the sleeves 53 and 54, a layer of cement 56a between the supporting sleeve 54 and end portion 58a, and a layer of cement 56b between the supporting sleeve 54 and the abutting portion of the flange 62.

In FIG. 5 is shown another form of flanged-type marine bearing 70 as an embodiment of the invention. It has an outer supporting sleeve 74 of plies 74a of resin-impregnated fibrous material, a reinforcing sleeve 73 of steel, and an elastomeric bearing sleeve 78, its ends having outwardly extending portions 78a and 78b. A flange 82, preferably of a corrosion-resistant metal and with bolt holes 86, is fitted over one end of the reinforcing sleeve 73, and the supporting sleeve 74 over the other end, with the ends of the flange 82 and supporting sleeve 74 abutting. There is a series of longitudinal, concentrically-spaced, drilled and tapped holes, the inner half portion of each hole penetrating the steel sleeve 73 and the outer half penetrating the flange 82 and sleeve 74. Set screws 84 inserted into the holes tie together mechanically the penetrated components. The strength of the connection between the sleeve 73 and the flange 82 may be enhanced by the application to the mating surfaces and the screws 84 prior to assembly of a heat-activated, epoxy-type bonding cement to form a strong adhesive or chemical bond between the contacting surfaces. The bearing sleeve 78 has a polyhedral inside shape, with bearing surfaces 79 and flutes 80 for water circulation, and is bonded to the inside cylindrical surface of the reinforcing sleeve 73 with a layer of bonding cement 81, its outwardly extending portion 78a to one end of the reinforcing sleeve 73 with a layer of bonding cement 81a, and its outwardly extending portion 78b to the flange end of the reinforcing sleeve 73 with a layer of bonding cement 81c and to the internal portion of the flange 82 with a layer of bonding cement 81b. The plies 74a of the supporting sleeve 74 are impregnated and bonded together with a thermoset synthetic resin composition, which also forms a bond between the supporting sleeve 74 and the outer surface of the reinforcing sleeve 73, the outwardly extending portion 78a of the bearing sleeve 78, and the back surface of the flange 82 against which it abuts. This bond is enhanced by a layer of adhesive bonding cement 76 between the sleeves 73 and 74, a layer of cement 76a between the supporting sleeve 74 and the end portion 78a and a layer 76b between the supporting sleeve 74 and the abutting portion of the flange 82.

Referring to FIG. 6, a further modified flange-type marine bearing 90 is shown. It has an outer supporting sleeve 94 composed of concentric plies 94a of resin-impregnated fibrous material; an intermediate reinforcing sleeve 93, which also includes an integral flange portion 102 with bolt holes 106; and an inner bearing sleeve 98 of elastomeric or rubber-like material. The reinforcing sleeve 93, with its flange 102, is of a non-corrosive metal, such as naval brass, anodized aluminum, or stainless steel. The resilient bearing sleeve 98 has a polyhedral inside shape, with flats 99 and flutes 100, and is bonded to the inner cylindircal surface of the reinforcing sleeve 93 and flange 102 with a layer of adhesive or chemical bonding cement 101. The plies 94a of the supporting sleeve 94 are impregnated and bonded together with a thermoset synthetic resin composition, which also forms a bond between the supporting sleeve 94 and the outer cylindrical surface of the reinforcing sleeve 93 and the back surface of the flange 102 against which it abuts. This bond is enhanced by a layer of adhesive bonding cement 96 between the sleeves 93 and 94, and a layer of bonding cement 96b between the end of the sleeve 94 and the abutting portion of the flange 102.

In a typical production and usage of a marine bearing 10 of this invention, the components of the bearing 10 are molded under heat and pressure into a unitary, composite structure. The phenolic-impregnated, fibrous sleeve 14 is preformed by wrapping the plies 14a concentrically around a supporting mandrel, which may be the metal sleeve 13, baked to set the thermosetting phenolic resin, and then ground to the proper cylindrical diameter. This preformed supporting sleeve 14 composed of, that is reinforced with, plies 14a of fibrous sheets of paper, woven cloth or duck, or woven glass fibers, together with the reinforcing sleeve 13, to which bonding cement has been applied, and the inner bearing sleeve 18 of raw rubber, are placed in a mold (not shown), and the components then set or cured under pressure and heat into the unitary composite bearing 10.

To install the sleeve-type marine bearing 10, it is pressed into a mating cylindrical opening of the bearing support of a ship, with the propeller shaft of the ship passing through the polyhedral opening of the bearing and supported by the flat surfaces 19 while rotating. The bearing 10 may be further secured in place by set screws passing through the bearing support and penetrating into the supporting sleeve 14 of the bearing 10. As the boat is operated and the shaft rotates, water flows through the flutes or channels 20 of the bearing 10, cooling and lubricating the bearing and shaft, and flushing out sand and other abrasive particles which enter. With no exposed metal in the bearing 10, the reinforcing steel sleeve 13 being isolated from the surrounding water, the non-conductive fibrous sleeve 14 contacting the bearing support and the non-conductive rubber 18 contacting the rotating shaft of the boat, there is consequently no electrolytic action and no rusting or corrosion. These factors also preclude binding of the bearing in the bearing support, so removal of the bearings for replacement is facilitated, and there are no corroded or rusted parts to be cleaned or replaced.

The flanged-type marine bearings 30, 50, 70 and 90 are produced also by molding with the application of heat and pressure, as is the cylindrical-type bearing 10, to form a unitary, composite structure. Referring to the bearing 30 as depicted in FIG. 3 and exemplary of the flanged-type bearings, the reinforcing metal sleeve 33 and flange 42 of corrosion-resistant metal are assembled together, the supporting sleeve 34 made up of thermoset phenolic-impregnated plies 34a is inserted over the reinforcing sleeve 33, the bearing sleeve 38 of raw rubber placed inside of the reinforcing sleeve 33; and the components are then set and cured in a mold under heat and pressure to form the finished bearing 30.

To install the bearing 30, it is inserted into a mating cylindrical opening of a bearing support of a ship, with the propeller shaft of the ship passing through the polyhedral opening of the bearing and supported by the flat surfaces 39 while rotating. The bearing 30 is secured in place by bolts inserted through the bolt holes 46 of the flange 42 and screwed into corresponding tapped holes in the face of the bearing support. As the boat is operated and the shaft rotates, water flows through the channels 40 of the bearing 30, cooling and lubricating the bearing and shaft, while flushing out sand and other abrasive particles which enter. With the non-conductive fibrous sleeve 34 in contact with the cylindrical portion of the bearing support, the non-conductive bearing rubber 38 in contact with the propeller shaft, and the corrosion-resistant flange 42 in contact with the face of the bearing support, electrolysis and corrosion are minimized. Thus, binding of the bearing in the bearing support is precluded, removal of the bearings for replacement is facilitated, and cleaning and replacement of corroded or rusted parts is avoided.

While typical embodiments of the invention have been shown by way of illustration, it will be understood that various other modifications will occur to those skilled in the art. For example, different non-conductive tubular materials with adequate physical properties, such as plastics or wood, might be substituted for the resin-impregnated fibrous supporting sleeve. Also, the marine bearing construction as shown in FIGS. 1 and 2 might be reversed. Normally, the bearing fits in the annular space between the bearing support and the propeller shaft of a ship, the supporting sleeve in contact with the bearing support, the bearing sleeve in contact with the shaft, and the reinforcing sleeve adhesively bonded between the other two sleeves. With the reverse installation in the annular space between the bearing support and the propeller shaft of the ship, the bearing would rotate with the shaft, the supporting sleeve being on the inside pressed onto the shaft and the bearing sleeve on the outside rotating inside the cylindrical opening of the bearing support, with the reinforcing sleeve bonded between the supporting sleeve and the bearing sleeve, and the latter longitudinally fluted on the outside to provide for flow of water between the rubber bearing material and the bearing support against which it rotates.

I claim:
1. A water-lubricated composite bearing structure comprising:
 (a) concentric supporting, reinforcing, and bearing sleeves;
 (b) said supporting sleeve being bonded to one cylindrical surface of said reinforcing sleeve and providing an external surface adapted to be snugly and removably fitted to a bearing support;
 (c) said bearing sleeve being bonded to the other cylindrical surface of said reinforcing sleeve;
 (d) said reinforcing sleeve being of metal;
 (e) said bearing sleeve being of resilient, elastomeric material and adapted to insulate said reinforcing sleeve from a member rotatably supported thereby;
 (f) said supporting sleeve being of thermoset, synthetic resin composition reinforced with fibrous material and adapted to insulate electrically said reinforcing sleeve from the bearing support;
 (g) said reinforcing sleeve being substantially completely encased by said bearing sleeve and said supporting sleeve to isolate substantially said reinforcing sleeve from surrounding water;
 (h) a flange carried by one end of said reinforcing sleeve; and

(i) means for securing said flange to said reinforcing sleeve including a thread on the outside of one end of said reinforcing sleeve and a complementary thread on the inside of said flange.

2. A water-lubricated composite bearing structure comprising:
(a) concentric supporting, reinforcing, and bearing sleeves;
(b) said supporting sleeve being bonded to one cylindrical surface of said reinforcing sleeve and providing an external surface adapted to be snugly and removably fitted to a bearing support;
(c) said bearing sleeve being bonded to the other cylindrical surface of said reinforcing sleeve;
(d) said reinforcing sleeve being of metal;
(e) said bearing sleeve being of resilient, elastomeric material and adapted to insulate said reinforcing sleeve from a member rotatably supported thereby;
(f) said supporting sleeve being of thermoset, synthetic resin composition reinforced with fibrous material and adapted to insulate electrically said reinforcing sleeve from the bearing support;
(g) said reinforcing sleeve being substantially completely encased by said bearing sleeve and said supporting sleeve to isolate substantially said reinforcing sleeve from surrounding water;
(h) a flange carried by one end of said reinforcing sleeve; and
(i) means for securing said flange to said reinforcing sleeve including a cylindrical surface on the outside of one end of said reinforcing sleeve and a complementary tight-fitting cylindrical surface on the inside of said flange.

3. A water-lubricated composite bearing structure as defined in claim 2, wherein said securing means includes an adhesive bonding cement between said surfaces.

4. A water-lubricated composite bearing structure comprising:
(a) concentric supporting, reinforcing, and bearing sleeves;
(b) said supporting sleeve being bonded to one cylindrical surface of said reinforcing sleeve and providing an external surface adapted to be snugly and removably fitted to a bearing support;
(c) said bearing sleeve being bonded to the other cylindrical surface of said reinforcing sleeve;
(d) said reinforcing sleeve being of metal;
(e) said bearing sleeve being of resilient, elastomeric material and adapted to insulate said reinforcing sleeve from a member rotatably supported thereby;
(f) said supporting sleeve being of thermoset, synthetic resin composition reinforced with fibrous material and adapted to insulate electrically said reinforcing sleeve from the bearing support;
(g) said reinforcing sleeve being substantially completely encased by said bearing sleeve and said supporting sleeve to isolate substantially said reinforcing sleeve from surrounding water;
(h) a flange carried by one end of said reinforcing sleeve; and
(i) means for securing said flange to said reinforcing sleeve including a cylindrical surface on the outside of one end of said reinforcing sleeve, a complementary cylindrical surface on the inside of said flange, and screws engaging both of said surfaces.

References Cited

UNITED STATES PATENTS

| | | | |
|---|---|---|---|
| 2,310,923 | 2/1943 | Bean | 308—238 |
| 2,327,035 | 8/1943 | Gray et al. | 308—26 |
| 2,389,253 | 11/1945 | Gatke | 308—238 |
| 2,839,340 | 6/1958 | Merchant | 308—26 |
| 3,002,770 | 10/1961 | Chestnut et al. | 156—187 X |
| 3,023,059 | 2/1962 | Kirk | 308—238 |
| 3,155,530 | 11/1964 | Schnedler | 117—26 X |
| 3,250,556 | 5/1966 | Couch et al. | 308—238 X |
| 3,268,280 | 8/1966 | Miller | 308—238 X |
| 3,311,529 | 3/1967 | Chisholm | 117—127 X |
| 3,330,605 | 7/1967 | Jasmand | 308—238 X |

FOREIGN PATENTS

| | | |
|---|---|---|
| 805,539 | 12/1958 | Great Britain. |
| 1,038,158 | 8/1966 | Great Britain. |

MARTIN P. SCHWADRON, Primary Examiner

FRANK SUSKO, Assistant Examiner